United States Patent
Kawaguchi (10) Patent No.: US 9,173,119 B2
(45) Date of Patent: Oct. 27, 2015

(54) GATEWAY, SERVER AND COMMUNICATION CONTROL METHOD THEREOF, AND GATEWAY SYSTEM

(75) Inventor: Kenji Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/824,186

(22) PCT Filed: Jun. 10, 2011

(86) PCT No.: PCT/JP2011/003293
§ 371 (c)(1),
(2), (4) Date: Mar. 15, 2013

(87) PCT Pub. No.: WO2012/039082
PCT Pub. Date: Mar. 29, 2012

(65) Prior Publication Data
US 2013/0281081 A1    Oct. 24, 2013

(30) Foreign Application Priority Data
Sep. 24, 2010  (JP) ................................ 2010-213366

(51) Int. Cl.
*H04W 24/08*    (2009.01)
*H04W 8/26*    (2009.01)
(Continued)

(52) U.S. Cl.
CPC ............... *H04W 24/08* (2013.01); *H04W 8/26* (2013.01); *H04W 84/045* (2013.01); *H04W 88/16* (2013.01)

(58) Field of Classification Search
CPC ..... H04W 88/12; H04W 88/14; H04W 88/16; H04W 84/045; H04W 84/105; H04W 84/16; H04W 36/10; H04W 48/02; H04W 12/06; H04W 60/02; H04W 60/04; H04W 60/06; H04W 76/06; H04W 76/068; H04W 8/26; H04W 92/12; H04W 92/14; H04L 63/0876
USPC ........................ 455/422.1, 432.1–432.2, 433, 455/435.1–435.2, 436, 443, 444, 446–449, 455/456.1–456.5
See application file for complete search history.

(56) References Cited

U.S. PATENT DOCUMENTS

2005/0070283 A1\*  3/2005  Hashimoto et al. ........ 455/435.1
2008/0220800 A1\*  9/2008  Gunaratnam et al. ........ 455/510
(Continued)

FOREIGN PATENT DOCUMENTS

CN    101621757 A    1/2010
WO    2010/004608 A1  1/2010

OTHER PUBLICATIONS

3GPP TS 25.467 V8.4.0, "3rd Generation Partnership Project; Technical Specification Group Radio Access Network; UTRAN architecture for 3G Home Node B (HNB); Stage 2 (Release 8)", Dec. 2009, pp. 1-25.

(Continued)

*Primary Examiner* — George Eng
*Assistant Examiner* — Umair Ahsan
(74) *Attorney, Agent, or Firm* — Sughrue Mion, PLLC (57) ABSTRACT

In order to improve the accuracy of at least one of detecting that a UE camps on a femto cell and detecting that the UE decamps from the range femto cell, a gateway (110_1) forms a gateway system and relays traffic between a core network (20) and a base station (30_2). When TMSI or P-TMSI temporarily assigned to a UE (40_1) requesting to camp on the base station (30_2) is received from the base station (30_2) through a public network, the gateway (110_1) requests a server (120), which communicates with the core network (20) and the gateway (110_1), to notify IMSI permanently assigned to the UE (40_1) and associated with the TMSI or P-TMSI. In response to the request, the sever (120) acquires the IMSI from the core network (20) and notifies it to the gateway (110_1). The gateway (110_1) identifies the UE (40_1) by using the IMSI.

2 Claims, 9 Drawing Sheets

(51) Int. Cl.
*H04W 84/04* (2009.01)
*H04W 88/16* (2009.01)

(56) References Cited

U.S. PATENT DOCUMENTS

2010/0040023 A1 2/2010 Gallagher et al.
2011/0092207 A1* 4/2011 Motohashi et al. ......... 455/435.1
2013/0035097 A1* 2/2013 Zhou ............................ 455/433

OTHER PUBLICATIONS

3GPP TS 25.467 V9.3.0, "3rd Generation Partnership Project; Technical Specification Group Radio Access Network; UTRAN architecture for 3G Home Node B (HNB); Stage 2 (Release 9)", Jun. 2010, pp. 1-34.
International Search Report for PCT/JP2011/003293 dated Sep. 6, 2011.
Communication dated Apr. 15, 2015 from the State Intellectual Property Office of People's Republic of China in counterpart Application No. 201180045885.1.

* cited by examiner

| IMSI | RNC-ID |
|---|---|
| XXX (UE 40_1) | #110_1 (HNB-GW 110_1) |
| YYY (UE 40_2) | #110_2 (HNB-GW 110_2) |
| ... | ... |

| IMSI | CAMPED HNB-ID |
|---|---|
| XXX | #30_2 (HNB 30_2) |
| ... | ... |

| IMSI | CAMPED HNB-ID |
|---|---|
| YYY | #30_4 (HNB 30_4) |
| ... | ... |

GATEWAY, SERVER AND COMMUNICATION CONTROL METHOD THEREOF, AND GATEWAY SYSTEM

CROSS REFERENCE TO RELATED APPLICATIONS

This application is a National Stage of International Application No. PCT/JP2011/003293, filed on Jun. 10, 2011, which claims priority from Japanese Patent Application No. 2010-213366, filed on Sep. 24, 2010, the contents of all of which are incorporated herein by reference in their entirety.

TECHNICAL FIELD

The present invention relates to a gateway, a server and a communication control method of them, and a gateway system. In particular, the present invention relates to a technique to detect a user equipment camping on a femto cell and decamping from the femto cell.

BACKGROUND ART

In recent years, the development of a radio base station capable of being installed indoors or the like has been in progress. Since the coverage of a cell formed by this radio base station is extremely smaller than that of a radio base station installed outdoors (in the order of several meters to several tens of meters), the cell is generally called "femto cell". In the 3GPP (3rd Generation Partnership Project), a radio base station that forms a femto cell is standardized as "HNB (Home Node B)". Note that in the following explanation, a radio base station that forms a cell that is much larger than the femto cell (in general, called "macro cell") may be called "MNB (Macro Node B)" and thereby differentiated from the HNB.

Further, the HNB is connected to an HNB-GW (HNB Gateway) through a public network such as the Internet, and thereby incorporated into a mobile communication network (CN: Core Network). The HNB-GW relays traffic between the CN and the HNB.

Furthermore, since the HNB can be installed more easily in comparison to the macro base station, the use of the HNB for delivering presence information (e.g., information specific to the place in which the HNB is installed) or the like has been studied as well as the use of the HNB in dead zones (introduction for supplementing the coverage of macro cells).

A procedure for detecting that a typical UE (User Equipment) camps on a femto cell (hereinafter "camping detection procedure") and a procedure for detecting that the UE decamps from the femto cell (hereinafter "decamping detection procedure"), which are disclosed in e.g., NPL 1, will be sequentially described with reference to FIGS. 8 and 9.

[Camping Detection Procedure]

Figure 8:
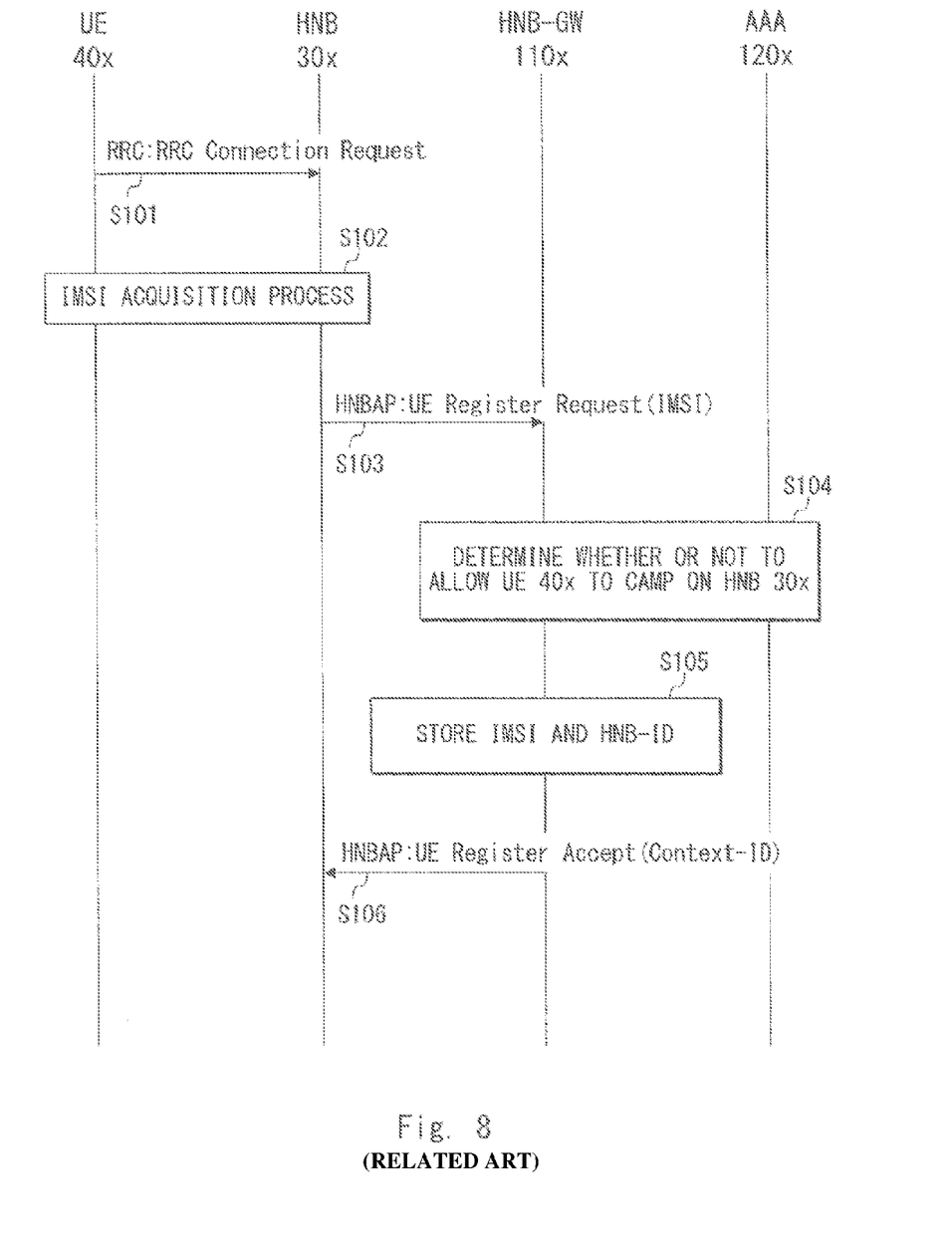
FIG. 8 is a sequence diagram showing a typical camping detection procedure.

As shown in FIG. 8, a UE 40x transmits an RRC (Radio Resource Control) Connection Request, which is a type of RRC messages, to an HNB 30x in order to register its location on the femto cell (step S101). Note that in the following explanation, an RRC message may be expressed as "RRC: MMM (arbitrary message type)".

At this time, if an IMSI (International Mobile Subscriber Identity) of the UE 40x is not notified to the HNB 30x, the UE 40x and the HNB 30x operate in cooperation to thereby perform a process for acquiring the IMSI (step S102). Specifically, the HNB 30x requests the UE 40x to notify the IMSI. In response to this request, the UE 40x notifies the IMSI to the HNB 30x. The IMSI is an identifier for uniquely identifying a subscriber all over the world and permanently assigned to a UE.

Then, the HNB 30x transmits a UE Register Request, which is a type of HNBAP (HNB Application Protocol) messages, to an HNB-GW 110x (step S103). The IMSI of the UE 40x is set in the UE Register Request message. Note that in the following explanation, an HNBAP message may be expressed as "HNBAP:MMM (arbitrary message type)".

When the HNB-GW 110x receives the UE Register Request message, the HNB-GW 110x operates in cooperation with an AAA (Authentication, Authorization, and Accounting) server 120x to thereby determine whether or not the UE 40x is allowed to camp on the HNB 30x (step S104). Specifically, the HNB-GW 110x notifies the IMSI of the UE 40x to the AAA server 120x, thereby inquiring whether or not to allow the camping. The AAA server 120x holds in advance a database in which, for each of HNBs to be monitored, identification information (hereinafter "HNB-ID") of each HNB is associated with IMSIs of UEs that are allowed to camp on each HNB. Therefore, the AAA server 120x refers to this database to determine whether or not to allow the UE 40x to camp on the HNB 30x.

As a result, when it is determined that the UE 40x is allowed to camp on the HNB 30x, the HNB-GW 110x internally stores the IMSI of the UE 40x in association with the HNB-ID of the HNB 30x (step S105).

Then, the HNB-GW 110x transmits to the HNB 30x an HNBAP:UE Register Accept message that indicates the registration completion of the UE 40x and includes a Context-ID for the UE 40x (step S106). With these processes, the camping detection procedure has been completed. Therefore, the UE 40x can receive a desired radio communication service(s) within the femto cell.

[Decamping Detection Procedure]

Figure 9:
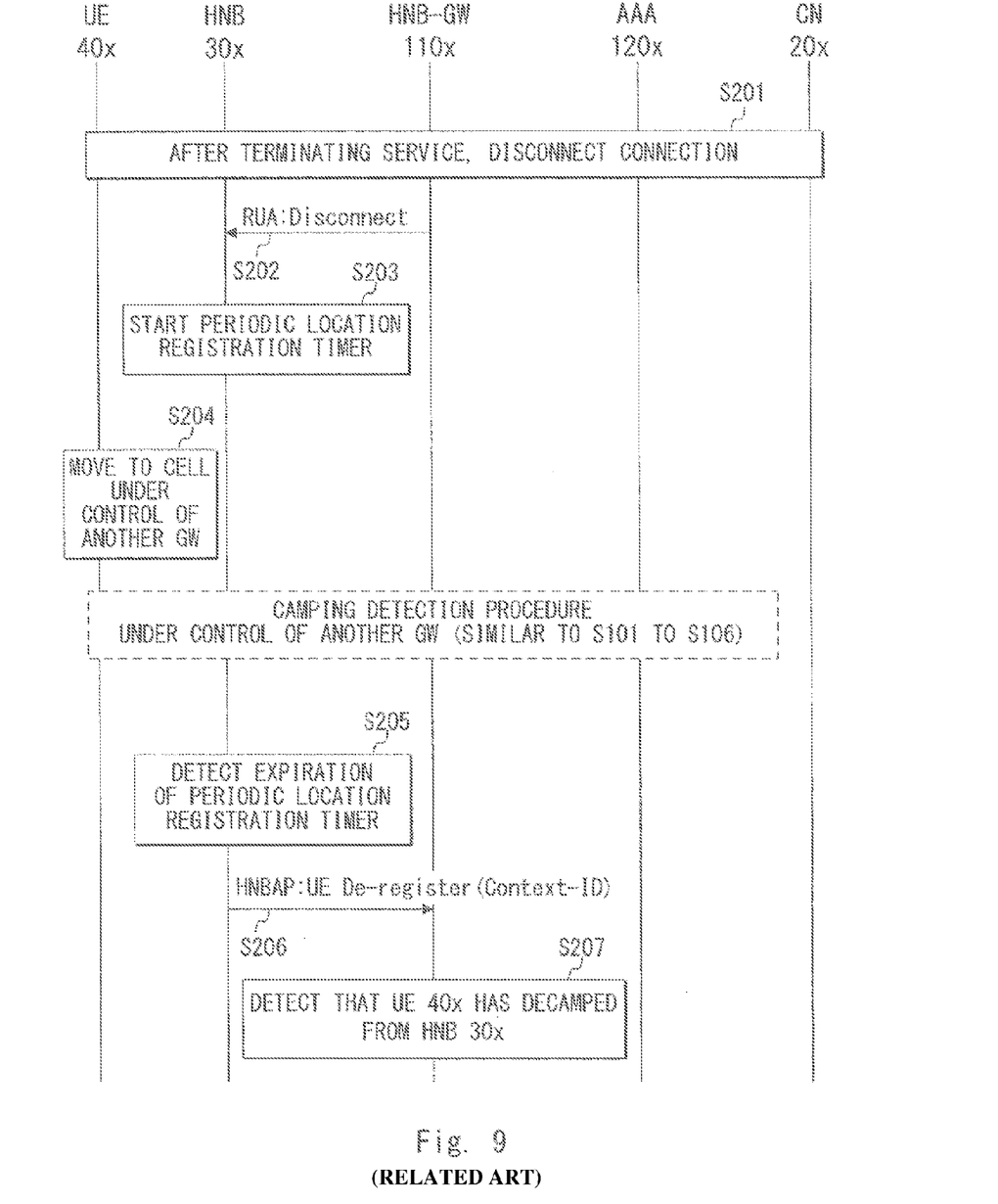
FIG. 9 is a sequence diagram showing a typical decamping detection procedure.

As shown in FIG. 9, after a voice service, a packet service and the like are terminated, the connection which has been established for each service is disconnected under the initiative of the CN 20x (step S201). At this time, the HNB-GW 110x transmits to the HNB 30x a Disconnect, which is a type of RUA (RANAP User Application) messages, thereby releasing the connection between the HNB 30x and the own HNB-GW 110x (step S202). Note that in the following explanation, an RUA message may be expressed as "RUA:MMM (arbitrary message type)".

When the HNB 30x receives the Disconnect message, the HNB 30x starts, on the own HNB 30x side, a timer (hereinafter referred to as "periodic location registration timer") which is also used by the UE 40x for transmitting a Location Updating Request message at regular intervals, thereby monitoring whether or not the UE 40x has decamped from the own HNB 30x (whether or not the UE 40x has moved from the femto cell formed by the HNB 30x to another cell) (step S203).

On the other hand, when the UE 40x which is in an idle state detects that a femto cell under control of another HNB-GW (or macro cell) has a better quality than that of the femto cell formed by the HNB 30x, the UE 40x moves to the femto cell under control of the another HNB-GW (or macro cell), thereby decamping from the HNB 30x (step S204). As a result, as shown by the dotted line in FIG. 9, a camping detection procedure similar to the one shown at the above-described steps S101 to S106 is performed under the control of the another HNB-GW.

After that, when the HNB 30x detects the expiration of the periodic location registration timer, the HNB 30x determines that the UE 40x has moved to another cell (step S205). Then, the HNB 30x transmits an HNBAP:UE De-register message including the Context-ID for the UE 40x to the HNB-GW 110x, thereby requesting to deregister the UE 40x (step S206).

Upon receiving the UE De-register message, the HNB-GW 110x detects that the UE 40x has decamped from the HNB 30x (step S207). At this time, the HNB-GW 110x deletes the IMSI and the HNB-ID stored at the above-described step S105. With these processes, the decamping detection procedure has been completed.

CITATION LIST

Non Patent Literature

NPL 1: 3GPP TS 25.467, "UTRAN architecture for 3G Home Node B (HNB); Stage 2 (Release 8)", V8.4.0, December 2009, Clause 5.1.2, Pages 11 and 12

SUMMARY OF INVENTION

Technical Problem

However, there is a problem in the above-described procedures that the accuracy of detecting that a UE camps on a femto cell and of detecting that a UE decamps from a femto cell is low.

Firstly, in the above-described camping detection procedure, it is very difficult to detect that a user equipment having a CSG (Closed Subscriber Group) function (hereinafter referred to as "CSG-compatible UE) camps on a femto cell. The CSG function is, in general, a function that makes it possible to access (wirelessly connect to) a closed cell. In other words, it is a function that allows only a predetermined user(s) and group(s) such as the owner of an HNB and his/her family to wirelessly connect to a femto cell.

Specifically, there is a possibility that when a radio connection is established between an HNB and a CSG-compatible UE, the IMSI could not be notified to the HNB depending on the UE. In this case, an identifier that is temporarily assigned to the CSG-compatible UE is notified from the HNB to an HNB-GW. Therefore, it is very difficult for the HNB-GW to identify the user (UE), and thus impossible to perform the camping detection. As a result, in a case of delivering presence information or the like, there are UEs to which the information can be delivered and UEs to which the information cannot be delivered.

In other words, it is desirable to make it possible to detect that not only the typical UE(s) but also the CSG-compatible UE(s) camps on the femto cell.

Further, in the above-described decamping detection procedure, it takes a very long time before the HNB-GW detects that the UE decamps from the femto cell regardless of whether the UE is the typical or CSG-compatible. This is because the minimum value of the above-described periodic location registration timer is set to a large value, i.e., to 6 minutes in accordance with the 3GPP specifications. If the decamping is not detected in a short time in the case of delivering the presence information, there is a possibility that incorrect information could be delivered to the user of a UE even though that UE has already moved to another cell. Taking as an example a case of delivering mutually-different information for respective cells, the incorrect information is the one that is specific to the place of the femto cell on which the UE originally camped but is irrelevant to the place of the cell to which the UE has moved.

Note that as a countermeasure for this problem, it is conceivable to shorten the periodic location registration timer. However, since the influences on both the UE and the NHB brought by this countermeasure are large, it is not a good measure. Specifically, when the UE does not change the cell on which the UE camps, the periodic location registration timer is also used for the purpose of sending out location information at regular intervals (for the purpose of notifying that the UE continuously camps on the same femto cell). Therefore, if the above-mentioned countermeasure is taken, it causes another problem that modifications (design changes and the like involved in the shortening of the periodic location registration timer) need to be made to the UE. In addition, it also causes further another problem that the battery power consumption of the UE increases. At the same time, it is necessary to make modifications to a large number of the existing HNBs. Therefore, it requires enormous expenditure to realize the above-mentioned countermeasure.

In other words, it is desirable to make it possible to detect in a short time that the UE decamps from the femto cell without having any influences on the UE and the HNB.

Accordingly, an exemplary object of the present invention is to improve the accuracy of at least one of detecting that a UE camps on a femto cell and detecting that the UE decamps from the femto cell.

Solution to Problem

In order to achieve the above-mentioned object, a gateway according to a first aspect of the present invention relays traffic between a core network and a base station. This gateway includes first communication means for communicating with the base station through a public network; second communication means for communicating with a server capable of communicating with the core network; and control means for controlling the first and second communication means. The control means is configured to acquire, when first identification information temporarily assigned to one user equipment requesting to camp on the base station is received from the base station, second identification information permanently assigned to the one user equipment and associated with the first identification information from the core network through the server; and identify the one mobile device by using the second identification information.

Further, a gateway according to a second aspect of the present invention relays traffic between a core network and a base station. This gateway includes first communication means for communicating with the base station through a public network; second communication means for communicating with a server capable of communicating with at least the own gateway and a different gateway that relays traffic between the core network and a different base station; and control means for controlling the first and second communication means. The control means is configured to wait until a certain time that is shorter than a cycle for a user equipment to transmit a location updating request has elapsed, by using as a trigger a connection release between the base station and the own gateway; acquire, when the certain time has elapsed, from the server identification information of a gateway accommodating a base station on which the user equipment camps; and determine, when the acquired identification information does not match identification information assigned to the own gateway, that the user equipment camps on the different base station.

Further, a server according to a third aspect of the present invention includes first communication means for communicating with a core network; second communication means for communicating with a gateway that relays traffic between the core network and a base station incorporated into the core network through a public network; and control means for controlling the first and second communication means. The control means is configured to acquire, when first identification information temporarily assigned to a user equipment requesting to camp on the base station is received from the gateway, second identification information permanently assigned to the user equipment and associated with the first identification information from the core network; and notify the second identification information to the gateway.

Further, a server according to a fourth aspect of the present invention includes first communication means for communicating with a core network; second communication means for communicating with a plurality of gateways each of which relays traffic between the core network and a base station incorporated into the core network through a public network; and control means for controlling the first and second communication means. The control means is configured to manage states in which one or more user equipments camp on a base station under control of each of the gateways, in association with identification information of each of the gateways; and notify, in response to an inquiry from one gateway about a state of one user equipment, the one gateway of identification information of a gateway corresponding to the one user equipment.

Further, a gateway system according to a fifth aspect of the present invention includes a gateway that relays traffic between a core network and a base station; and a server that communicates with the core network and the gateway. The gateway requests, when first identification information temporarily assigned to a user equipment requesting to camp on the base station is received from the base station through a public network, the server to notify second identification information permanently assigned to the user equipment and associated with the first identification information, and identifies the user equipment by using the second identification information. The server acquires, in response to the request, the second identification information from the core network, and notifies the second identification information to the gateway.

Further, a gateway system according to a sixth aspect of the present invention includes a plurality of gateways each of which relays traffic between a core network and base stations; and a server that communicates with each of the gateways. Each of the gateways waits until a certain time that is shorter than a cycle for a user equipment to transmit a location updating request has elapsed by using as a trigger a connection release between the own gateway and one of the base stations under control of the own gateway, inquires, when the certain time has elapsed, of the server about identification information of a gateway accommodating a base station on which the user equipment camps, and determines, when identification information notified in response to the inquiry does not match identification information assigned to the own gateway, that the user equipment camps on a base station under control of a different gateway. The server manage states in which one or more user equipments camp on the base stations under control of each of the gateways in association with identification information of each of the gateways, and notifies, in response to the inquiry from, each of the gateways of identification information of a gateway corresponding to the user equipment.

Further, a communication control method according to a seventh aspect of the present invention provides a method of controlling a gateway that relays traffic between a core network and a base station incorporated into the core network through a public network. This communication control method includes acquiring, when first identification information temporarily assigned to a user equipment requesting to camp on the base station is received from the base station, second identification information permanently assigned to the user equipment and associated with the first identification information from the core network through a sever capable of communicating with the core network; and identifying the user equipment by using the second identification information.

Further, a communication control method according to an eighth aspect of the present invention provides a method of controlling a gateway that relays traffic between a core network and a base station incorporated into the core network through a public network. This communication control method includes waiting until a certain time that is shorter than a cycle for a user equipment to transmit a location updating request has elapsed, by using as a trigger a connection release between the base station and the gateway; acquiring, when the certain time has elapsed, identification information of a gateway accommodating a base station on which the user equipment camps, from a server capable of communicating with at least the gateway and a different gateway that relays traffic between the core network and a different base station; and determining, when the acquired identification information does not match identification information assigned to the gateway, that the user equipment camps on the different base station.

Further, a communication control method according to a ninth aspect of the present invention provides a method of controlling a server that communicates with a core network and a gateway relaying traffic between the core network and a base station incorporated into the core network through a public network. This communication control includes acquiring, when first identification information temporarily assigned to a user equipment requesting to camp on the base station is received from the gateway, second identification information permanently assigned to the user equipment and associated with the first identification information from the core network; and notifying the second identification information to the gateway.

Furthermore, a communication control method according to a tenth aspect of the present invention provides a method of controlling a server that communicates with a core network and a plurality of gateways each of which relays traffic between the core network and a base station incorporated into the core network through a public network. This communication control method includes managing states in which one or more user equipments camp on a base station under control of each of the gateways, in association with identification information of each of the gateways; and notifying, in response to an inquiry from one gateway about a state of one user equipment, the one gateway of identification information of a gateway corresponding to the one user equipment.

Advantageous Effects of Invention

According to the present invention, it is possible to improve the accuracy of at least one of detecting that a UE camps on a femto cell and detecting that the UE decamps from the femto cell.

DESCRIPTION OF EMBODIMENTS

Hereinafter, first and second exemplary embodiments of a gateway and a server according to the present invention, and a gateway system to which these gateway and server are applied will be described with reference to FIGS. 1 to 5, 6A to 6C and 7. Note that the same elements are denoted by the same symbols throughout the drawings, and duplicated explanation is omitted as necessary for clarifying the explanation.

First Exemplary Embodiment

Figure 1:
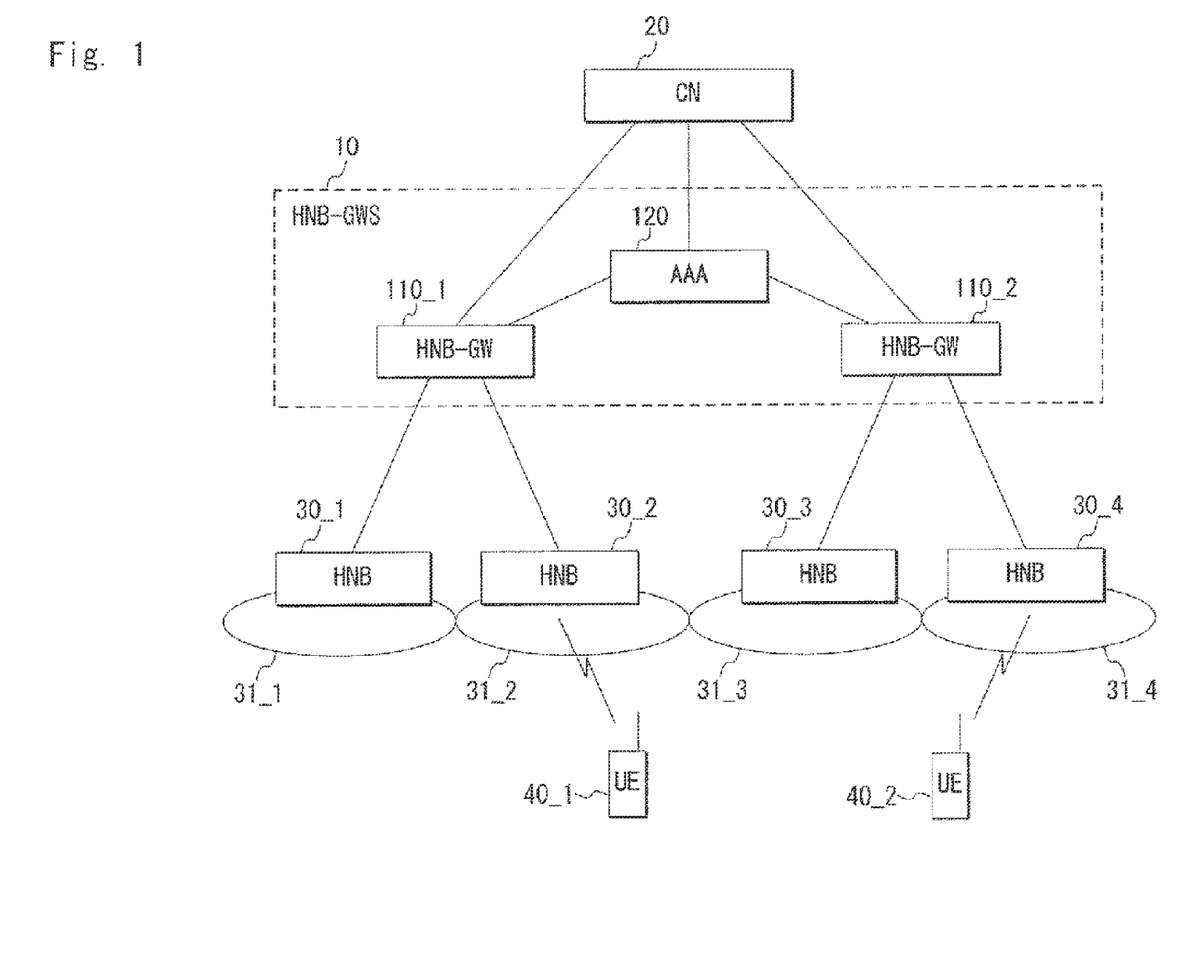
FIG. 1 is a block diagram showing a configuration example of a gateway system according to a first exemplary embodiment of the present invention.

As shown in FIG. 1, a gateway system (hereinafter "HNB-GWS") 10 according to this exemplary embodiment includes, as an example, two HNB-GWs 110_1 and 110_2, and an AAA server 120.

As an example, the HNB-GW 110_1 is connected to two HNBs 30_1 and 30_2 through a public network (not shown) such as the Internet, and thereby accommodates these HNBs 30_1 and 30_2. The HNB-GW 110_1 relays traffic between a CN 20 and the HNBs 30_1 and 30_2.

Similarly, as an example, the HNB-GW 110_2 is connected to two HNBs 30_3 and 30_4 through the public network, and thereby accommodates these HNBs 30_3 and 30_4. The HNB-GW 110_2 relays traffic between the CN 20 and the HNBs 30_3 and 30_4.

Note that in the following explanation, the HNB-GWs 110_1 and 110_2 may be collectively referred to by using a symbol "110" and the HNBs 30_1 to 30_4 may be collectively referred to by using a symbol "30".

On the other hand, the AAA server 120 is connected to the CN 20 and the HNB-GW 110 so that they can communicate with each other. The AAA server 120 has a function of controlling access to the HNB-GWS 10 and so on.

Further, the HNBs 30_1 to 30_4 form femto cells 31_1 to 31_4 respectively. Each of the HNBs 30_1 to 30_4 is compatible with the above-described CSG function, and broadcasts which CSG the own HNB belongs to by using broadcast information.

Furthermore, UEs 40_1 and 40_2 (hereinafter, also collectively referred to by using a symbol "40") have the CSG function, and thereby can move to the femto cells 31_1 to 31_4 or macro cells (not shown).

Next, specific configuration examples of the above-described HNB-GW 110 and AAA server 120 will be sequentially described with reference to FIGS. 2 and 3.

Figure 2:
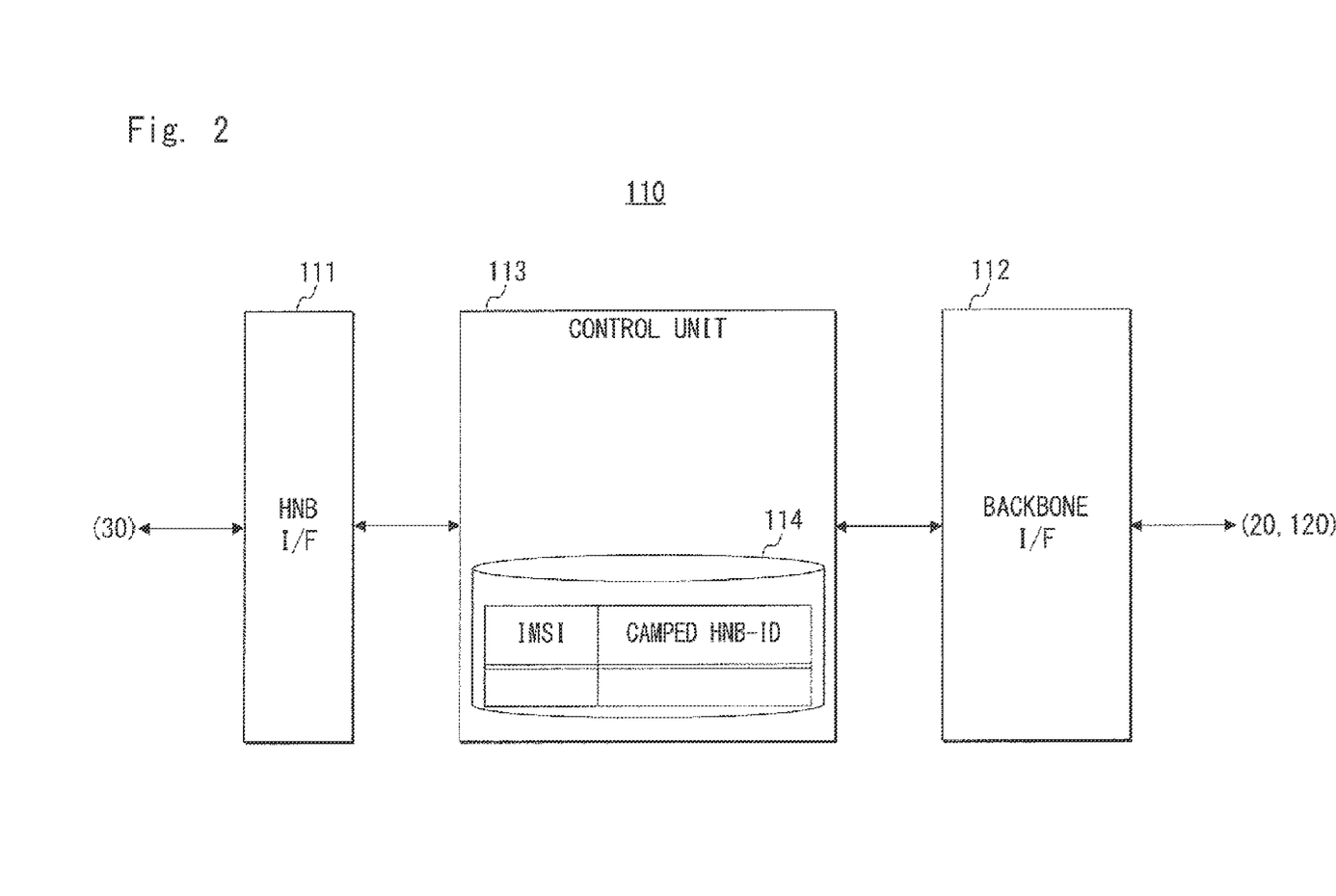
FIG. 2 is a block diagram showing a configuration example of a gateway according to the first exemplary embodiment of the present invention.

As shown in FIG. 2, the HNB-GW 110 according to this exemplary embodiment includes an HNB I/F 111, a backbone I/F 112, and a control unit 113 that controls these I/Fs 111 and 112. The HNB I/F 111 has a function of communicating with the HNB 30 through the public network. The backbone I/F 112 has a function of communicating with the CN 20 and the AAA server 120.

The control unit 113 performs a process to analyze and generate the above-described HNBAP messages, a process to generate the above-described RUA messages, a process to generate request messages to the AAA server 120, and a process to analyze response messages from the AAA server 120. Further, the control unit 113 has a management table 114 inside the control unit 113. As explained later, the management table 114 stores IMSIs of UEs in association with identification information (hereinafter, "camped HNB-IDs") of HNBs on which the UEs camp.

Figure 3:
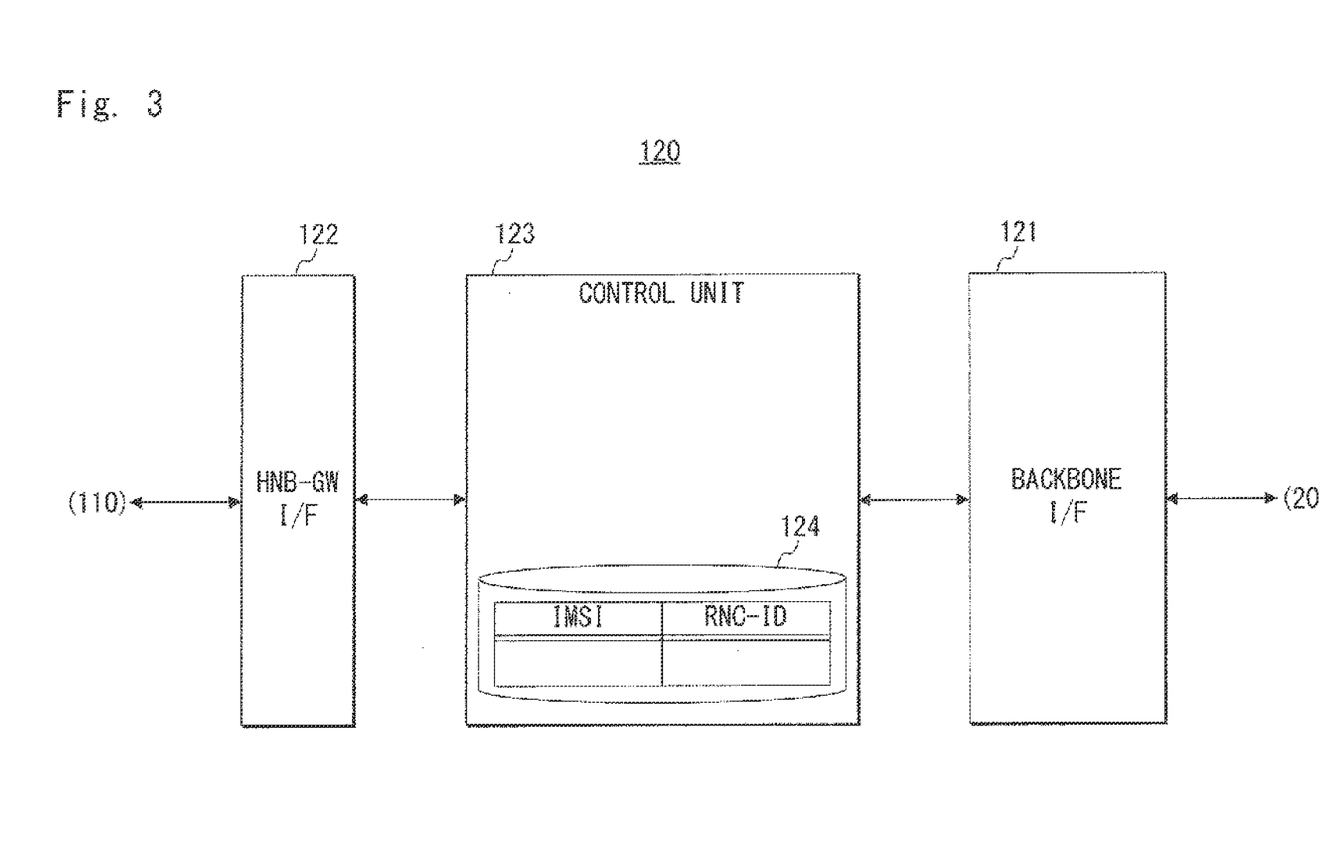
FIG. 3 is a block diagram showing a configuration example of a server according to the first exemplary embodiment of the present invention.

On the other hand, as shown in FIG. 3, the AAA server 120 according to this exemplary embodiment includes a backbone I/F 121, an HNB-GW I/F 122, and a control unit 123 that controls these I/Fs 121 and 122. The backbone I/F 121 has a function of communicating with the CN 20. The HNB-GW I/F 122 has a function of communicating with the HNB-GW 110.

The control unit 123 performs a process to analyze the request messages from the HNB-GW 110, and a process to generate the response messages to the HNB-GW 110. Further, the control unit 123 has a management table 124 inside the control unit 123. As explained later, the management table 124 stores IMSIs of UEs in association with identification information (hereinafter, "RNC-IDs") of HNB-GWs that accommodate HNBs on which the UEs camp. Note that to the RNC-ID of each HNB-GW, a value different from the ID of an RNC (Radio Network Controller) accommodating MNBs is assigned. Further, instead of the RNC-ID, the identification number of an LA (Location Area) or an RA (Routing Area) may be used as the identification information of the HNB-GW. In this case, to the identification number, a value that is mutually-different for each HNB-GW and different from the macro cell area is assigned.

Note that within the CN 20 shown in FIG. 1, there are an MSC (Mobile Services Switching Center) that implements circuit switching services, an SGSN (Serving GPRS Support Node) that implements packet switching services, and the like. However, since these entities are well known for those skilled in the art and are not directly related to the present invention, explanation of their configurations is omitted. Further, since the existing HNB and UE compatible with the CSG function can be used as the HNB 30 and UE 40, explanation of their configurations is omitted.

Hereinafter, operations of this exemplary embodiment will be described in detail with reference to FIGS. 4, 5, and 6A to 6C.

Firstly, an example of a process to register the HNB 30 on the HNB-GW 110 is explained with reference to FIG. 4. In this example, there is illustrated a case where the HNB 30_2 shown in FIG. 1 is newly registered on the HNB-GW 110_1.

Figure 4:
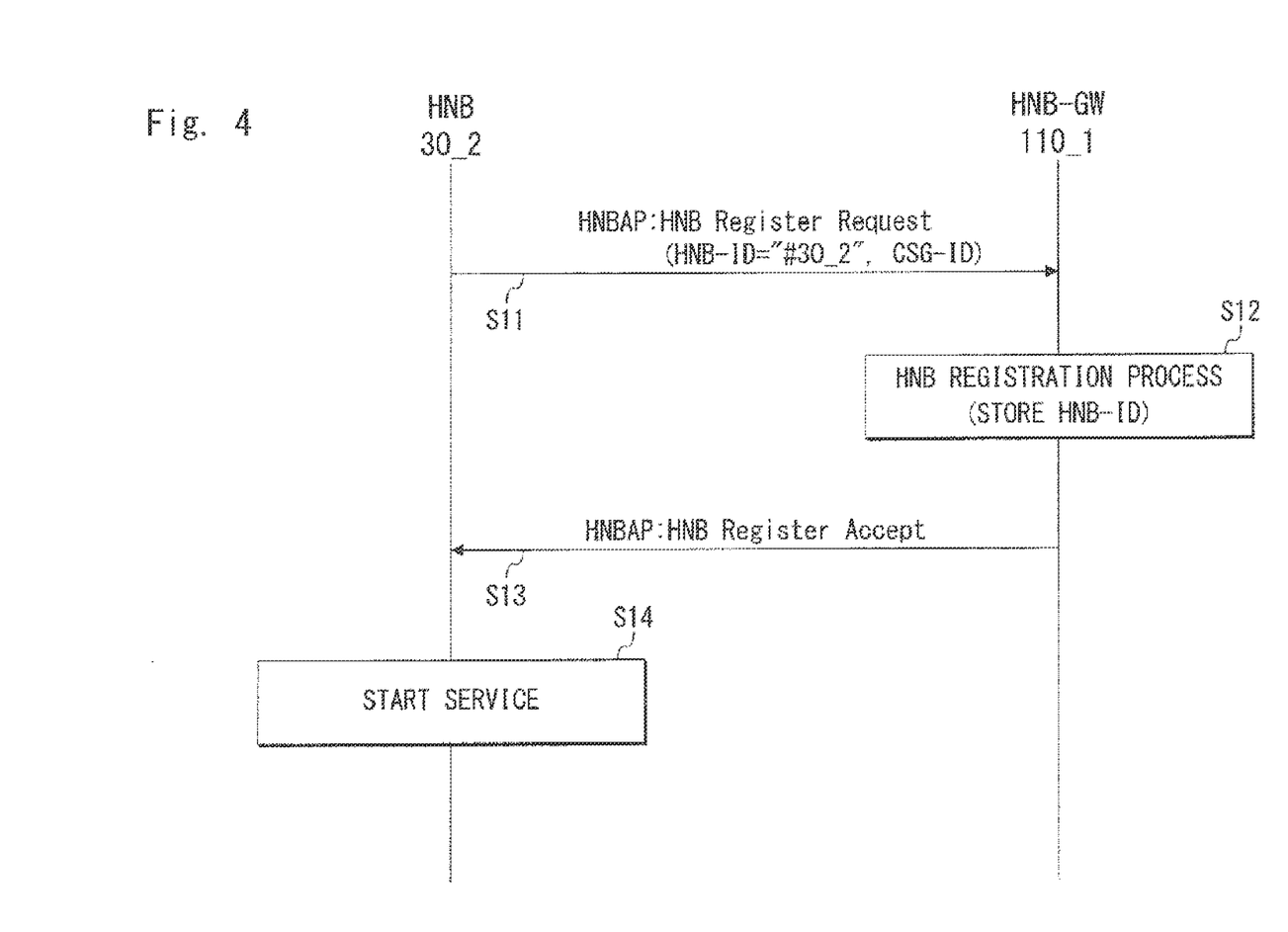
FIG. 4 is a sequence diagram showing an example of a process to register a base station in the gateway according to the first exemplary embodiment of the present invention.

As shown in FIG. 4, when the HNB 30_2 is installed in a home or the like, the HNB 30_2 transmits an HNBAP:HNB Register Request message to the HNB-GW 110_1 to be connected with the HNB 30_2 before starting services (step S11). In the HNB Register Request message, an HNB-ID="#30_2" that is preliminarily assigned to the HNB 30_2 and identification information (CSG-ID) of the CSG to which the HNB 30_2 belongs are set.

The HNB-GW 110_1 stores the notified HNB-ID into an internal table (step S12) and if the registration is acceptable, transmits to the HNB 30_2 an HNBAP:HNB Register Accept message indicating that the registration is permitted (step S13).

The HNB 30_2 sends out a radio wave by using as a trigger the reception of HNB Register Accept message, and thereby starts the services as the HNB (step S14).

Note that registration processes for the HNBs 30_1, 30_3 and 30_4 are similar to the above-described steps S11 to S14 except that their HNB-IDs and CSG-IDs to be notified are different. Therefore, their explanation is omitted.

Next, an example of a camping detection procedure in the HNB-GWS 10 is explained with reference to FIGS. 5 and 6A to 6C. In this example, there is illustrated a case where the UE 40_1 shown in FIG. 1 requests to camp on the HNB 30_2.

Figure 5:
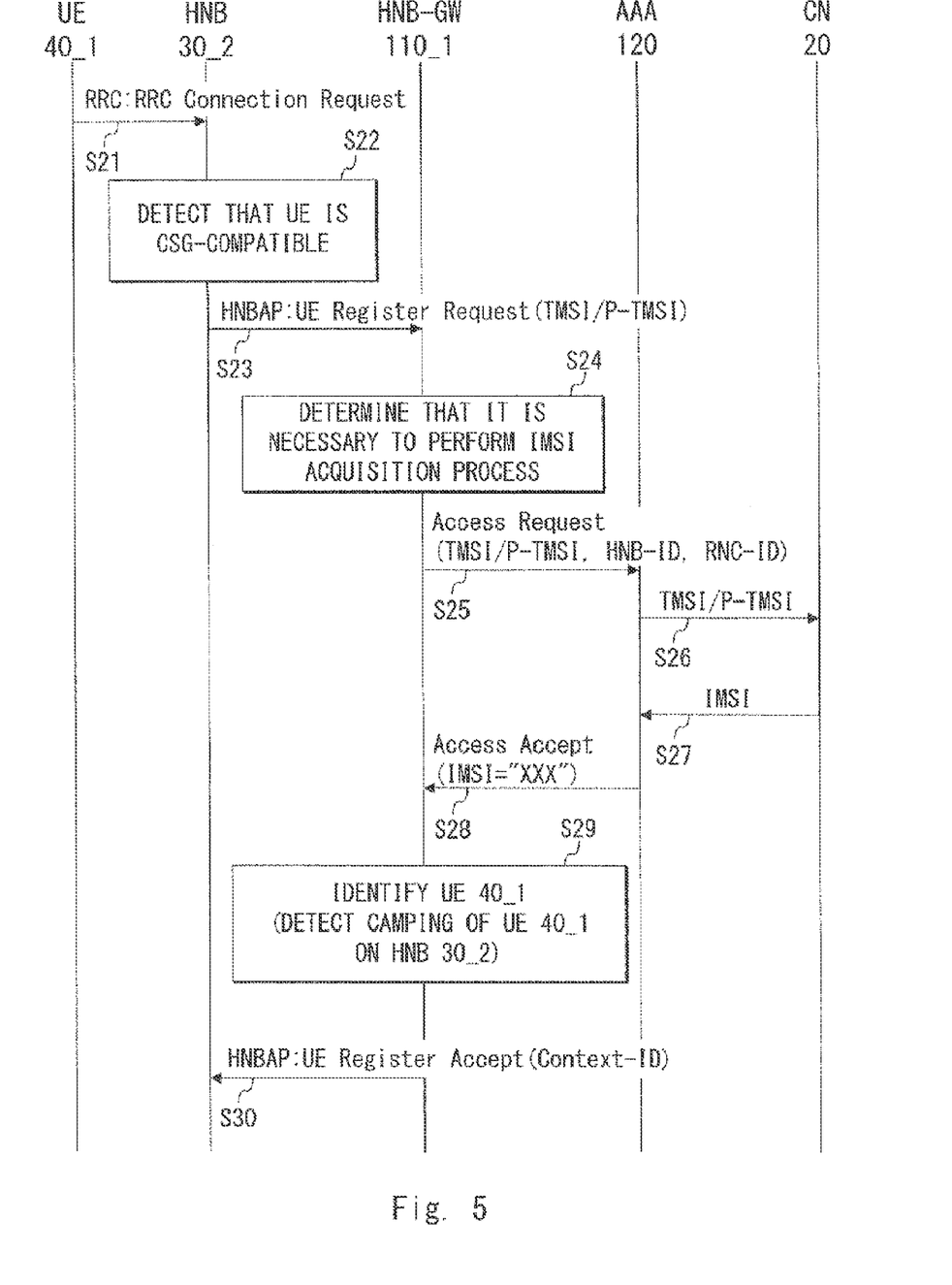
FIG. 5 is a sequence diagram showing an example of a camping detection procedure in the gateway system according to the first exemplary embodiment of the present invention.

As shown in FIG. 5, the UE 40_1 transmits an RRC:RRC Connection Request to the HNB 30_2 in order to register its location on a femto cell 31_2 shown in FIG. 1 (step S21). At this time, the UE 40_1 also notifies information on whether the CSG function is supported or not.

When the HNB 30_2 detects that the UE 40_1 is the CSG-compatible UE (step S22), the HNB 30_2 set an Initial UE Identity notified from the UE 40_1 as it is in an HNBAP:UE Register Request to be transmitted to the HNB-GW 110_1 (step S23). The Initial UE Identity is information used for identifying the UE in the first access. Specifically, the Initial UE Identity is a TMSI (Temporary Mobile Subscriber Identity) or a P-TMSI (Packet Temporary Mobile Subscriber Identity).

The TMIS and the P-TMSI are identifiers temporarily assigned to the UE 40_1 by the CN 20, and are updated at regular intervals for security reasons. Therefore, when the HNB-GW 110_1 receives the TMIS or the P-TMSI, the HNB-GW 110_1 cannot determine which user (UE) has accessed the HNB 30_2 and thus determines that a process to acquire the IMSI should be performed (step S24).

Then, the HNB-GW 110_1 transmits an Access Request message including the TMIS or the P-TMSI to the AAA server 120, thereby requesting the AAA server 120 to notify the IMSI (step S25). At this time, the HNB-GW 110_1 also notifies the AAA server 120 of the HNB-ID of the HNB 30_2 and the RNC-ID assigned to the own HNB-GW.

The AAA server 120 transmits the notified TMIS or P-TMSI to the CN 20 (step S26). Then, the AAA server 120 receives an IMSI="XXX" corresponding to the TMIS or the P-TMSI as its response (step S27). More specifically, the AAA server 120 accesses a database located within the CN 20 such as a VLR (Visitor Location Register) and thereby acquires the IMSI corresponding to the TMSI or the P-TMSI.

Then, the AAA server 120 transmits an Access Accept message including the acquired IMSI to the HNB-GW 110_1 (step S28).

Figure 6A:
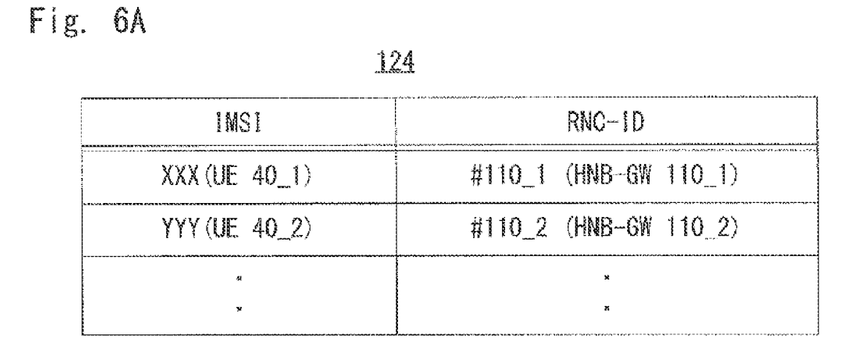
FIG. 6A shows an example of setting a management table used in the server according to the first exemplary embodiment of the present invention.

In parallel with these process, as shown in FIG. 6A, the AAA server 120 stores the acquired IMSI="XXX" into the management table 124, in association with the RNC-ID="#110_1" of the HNB-GW 110_1. Thus, the AAA server 120 manages that the UE 40_1 camps on the HNB under control of the HNB-GW 110_1. Note that in the management table 124 shown in FIG. 6A, it is also managed that another UE 40_2 shown in FIG. 1 camps on the HNB under control of another HNB-GW 110_2.

Figure 6B:
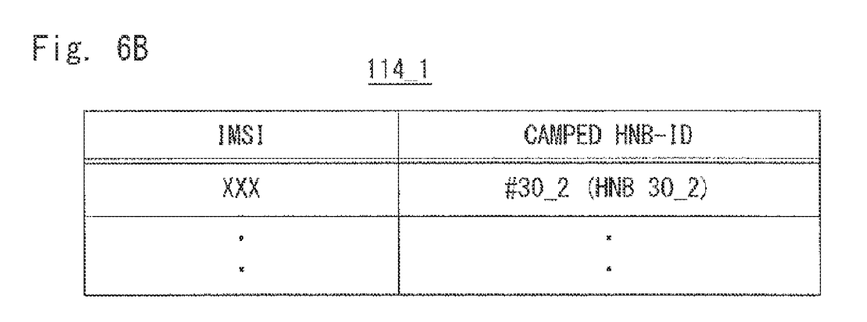
FIG. 6B shows an example of setting a management table used in the gateway according to the first exemplary embodiment of the present invention.
Figure 6C:
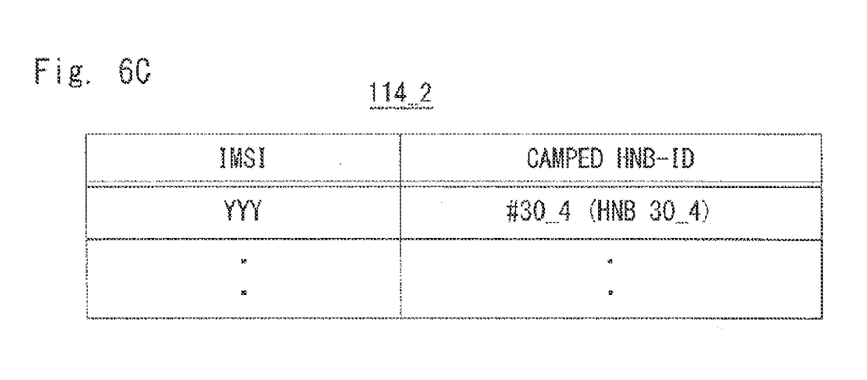
FIG. 6C shows another example of setting the management table used in the gateway according to the first exemplary embodiment of the present invention.

The HNB-GW 110_1 identifies the UE 40_1 based on the notified IMSI="XXX", thereby detecting that the UE 40_1 camps on the HNB 30_2 (step S29). At this time, as shown in FIG. 6B, the HNB-GW 110_1 stores the notified IMSI="XXX" into its own management table 114_1, in association with the HNB-ID="#30_2" of the HNB 30_2. Thus, the HNB-GW 110_1 manages that the UE 40_1 camps on the HNB 30_2. Similarly, as shown in FIG. 6C, when the UE 40_2 camps on the HNB 30_4, an IMSI="YYY" of the UE 40_2 is stored into the management table 114_2 of the HNB-GW 110_2, in association with the HNB-ID="#30_4" of the HNB 30_4.

Then, the HNB-GW 110_1 transmits to the HNB 30_2 an HNBAP:UE Register Accept message which indicates that the registration of the UE 40_1 has completed and which includes a Context-ID for the UE 40_1 (step S30). With these processes, the camping detection procedure has been completed. Therefore, the UE 40_1 can receive a desired radio communication service(s) within the femto cell.

As described above, in this exemplary embodiment, it is possible to detect that the CSG-compatible UE camps on the femto cell. Therefore, it is possible to significantly improve the accuracy of detecting that a UE camps on a femto cell in comparison to the camping detection procedure shown in FIG. 8. Further, in a case of delivering presence information or the like, the information can be delivered to both the typical UE and the CSG-compatible UE.

Second Exemplary Embodiment

An HNB-GWS according to this exemplary embodiment can be configured in a similar manner to that shown in FIG. 1. Further, an HNB-GW and an AAA server according to this exemplary embodiment can be configured in a similar manner to those shown in FIGS. 2 and 3 respectively.

Figure 7:
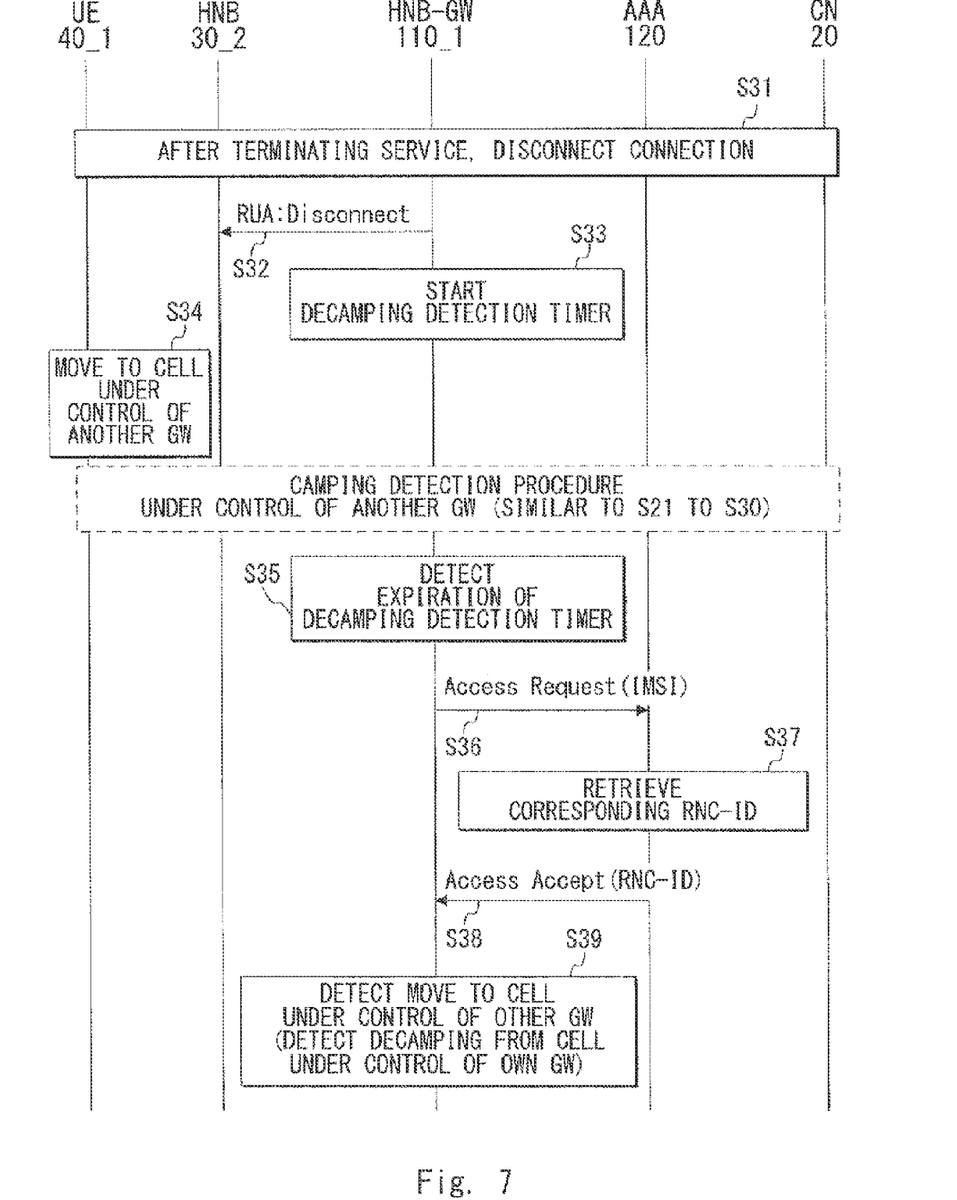
FIG. 7 is a sequence diagram showing an example of a decamping detection procedure in a gateway system according to a second exemplary embodiment of the present invention.

Meanwhile, this exemplary embodiment includes performing a decamping detection procedure as shown in FIG. 7 and thereby achieves an advantageous effect that the accuracy of detecting a UE decamping from a femto cell can be also improved as explained below. Note that this advantageous effect can be equally achieved regardless of whether the UE to be detected is the typical UE or the CSG-compatible UE. Further, by performing both the camping detection procedure in the above-described first exemplary embodiment and the decamping detection procedure in this exemplary embodiment, it is possible to improve the accuracy of both of detecting that a UE camps on a femto cell and detecting that the UE decamps from the femto cell.

Specifically, as shown in FIG. 7, after a voice service, a packet service and the like are terminated, the connection which has been established for each service is disconnected under the initiative of the CN 20 (step S31). At this time, the HNB-GW 110_1 transmits an RUA:Disconnect to the HNB 30_2, thereby releasing the connection between the HNB 30_2 and the own HNB-GW 110_1 (step S32).

At this time, the HNB-GW 110_1 starts a timer (hereinafter, referred to as "decamping detection timer") for detecting that the UE 40_1 decamps from the HNB 30_2 (step S33). The decamping detection timer is set to a time period that is shorter than that of the above-described periodic location registration timer.

On the other hand, when the UE 40_1, which is in an idle state, detects that a femto cell under control of another HNB-GW 110_2 has a better quality than that of the femto cell 31_2 shown in FIG. 1, the UE 40_1 moves to the femto cell under control of the HNB-GW 110_2, thereby decamping from the HNB 30_2 (step S34). As a result, as shown by the dotted line in FIG. 7, a camping detection procedure similar to the one shown at the above-described steps S21 to S30 is performed under the control of the HNB-GW 110_2. Note that in a case where the UE 40_1 is the typical UE, a camping detection procedure similar to the one shown in FIG. 8 is performed.

After that, when the HNB-GW 110_1 detects the expiration of the decamping detection timer (step S35), the HNB-GW 110_1 transmits to the AAA server 120 an Access Request message including the IMSI of the UE 40_1, thereby inquiring about an RND-ID of an HNB-GW that accommodates an HNB on which the UE 40_1 camps (step S36).

The AAA server 120 retrieves the management table 124 shown in FIG. 3 and acquires the RNC-ID corresponding to the notified IMSI (step S37). Then, the AAA server 120 transmits to the HNB-GW 110_1 an Access Accept message including the acquired RNC-ID (step S38).

At this moment, since the UE 40_1 camps on the HNB under control of the HNB-GW 110_2, the RND-IC notified from the AAA server 120 is different from the RND-IC assigned to the HNB-GW 110_1. In this case, the HNB-GW 110_1 detects that the UE 40_1 has moved to a femto cell under control of another HNB-GW, i.e., detects that the UE 40_1 has decamped from the HNB under control of the own HNB-GW (step S39). At this time, the HNB-GW 110_1 deletes the IMSI and the HNB-ID stored in the above-described camping detection procedure. With these processes, the decamping detection procedure has been completed.

Note that when the RNC-ID notified from the AAA server 120 matches the RNC-ID assigned to the HNB-GW 110_1, it means that the UE 40_1 continuously camps on the HNB 30_2 or camps on the other HNB 30_1 under control of the HNB-GW 110_1. Therefore, the HNB-GW 110_1 does not detect the decamping.

As described above, in this exemplary embodiment, it is possible to detect in a shorter time that the UE decamps from the femto cell in comparison to the decamping detection procedure shown in FIG. 9. Therefore, in a case of delivering presence information or the like, it is possible to reduce the delivery of incorrect information. Further, since there is no need to make modifications to the UE and the HNB, there is no adverse influence on the UE and the HNB.

Further, in this exemplary embodiment, although the decamping detection procedure is described in the case where the UE moves to the femto cell under control of another HNB-G, it is also possible to detect decamping from the femto cell in a short time even when the UE moves to a macro cell.

Specifically, at the timing of the above-described step S37, the AAA server 120 accesses a database located within the CN 20 such as the VLR, thereby acquiring an RNC-ID assigned to an RNC accommodating an MNB on which the UE 40_1 camps. Then, the AAA server 120 transmits to the HNB-GW 110_1 an Access Accept message including that RNC-ID. As described above, a value different from the ID of the RNC accommodating the MNB is assigned to the RNC-ID of each HMB-GW. Therefore, the HNB-GW 110_1 detects that the UE 40_1 has decamped from the HNB under control of the own HNB-GW.

Note that it is obvious that the present invention is not limited to the above-described exemplary embodiments and various modifications can be made by those killed in the art based on the descriptions of the patent claims.

This application is based upon and claims the benefit of priority from Japanese patent application No. 2010-213366, filed on Sep. 24, 2010, the disclosure of which is incorporated herein in its entirety by reference.

INDUSTRIAL APPLICABILITY

The present invention can be applied to a gateway, a server and a communication control method of them, and a gateway system. In particular, the present invention can be applied for the purpose of detecting a user equipment camping on a femto cell and decamping from the femto cell.

The whole or part of the exemplary embodiments disclosed above can be described as, but not limited to, the following supplementary notes.

(Supplementary Note 1)

A gateway that relays traffic between a core network and a base station, the gateway comprising:

first communication means for communicating with the base station through a public network;

second communication means for communicating with a server capable of communicating with the core network; and control means for controlling the first and second communication means, wherein the control means is configured to:

acquire, when first identification information temporarily assigned to one user equipment requesting to camp on the base station is received from the base station, second identification information permanently assigned to the one user equipment and associated with the first identification information from the core network through the server; and identify the one mobile device by using the second identification information.

(Supplementary Note 2)

The gateway according to Supplementary note 1, wherein the control means is configured to:

wait until a certain time that is shorter than a cycle for the one user equipment to transmit a location updating request has elapsed, by using as a trigger a connection release between the base station and the own gateway;

acquire, when the certain time has elapsed, from the server third identification information of a gateway accommodating a base station on which the one user equipment camps; and determine, when the third identification information does not match identification information assigned to the own gateway, that the one user equipment camps on a different base station.

(Supplementary Note 3)

A gateway that relays traffic between a core network and a base station, the gateway comprising:

first communication means for communicating with the base station through a public network;

second communication means for communicating with a server capable of communicating with at least the own gateway and a different gateway that relays traffic between the core network and a different base station; and control means for controlling the first and second communication means, wherein the control means is configured to:

wait until a certain time that is shorter than a cycle for a user equipment to transmit a location updating request has elapsed, by using as a trigger a connection release between the base station and the own gateway;

acquire, when the certain time has elapsed, from the server identification information of a gateway accommodating a base station on which the user equipment camps; and determine, when the acquired identification information does not match identification information assigned to the own gateway, that the user equipment camps on the different base station.

(Supplementary Note 4)

A server comprising:

first communication means for communicating with a core network;

second communication means for communicating with a gateway that relays traffic between the core network and a base station incorporated into the core network through a public network; and control means for controlling the first and second communication means, wherein the control means is configured to:

acquire, when first identification information temporarily assigned to a user equipment requesting to camp on the base station is received from the gateway, second identification information permanently assigned to the user equipment and associated with the first identification information from the core network; and notify the second identification information to the gateway.

(Supplementary Note 5)

A server comprising:

first communication means for communicating with a core network;

second communication means for communicating with a plurality of gateways each of which relays traffic between the core network and a base station incorporated into the core network through a public network; and control means for controlling the first and second communication means, wherein the control means is configured to:

manage states in which one or more user equipments camp on a base station under control of each of the gateways, in association with identification information of each of the gateways; and notify, in response to an inquiry from one gateway about a state of one user equipment, the one gateway of identification information of a gateway corresponding to the one user equipment.

(Supplementary Note 6)

The server according to Supplementary note 5, wherein the control means is configured to:

acquire from the core network identification information of a control device accommodating a different base station on which the one user equipment camps, by using the inquiry as a trigger; and notify the identification information of the control device to the one gateway.

(Supplementary Note 7)

A gateway system comprising:

a gateway that relays traffic between a core network and a base station; and a server that communicates with the core network and the gateway, wherein the gateway requests, when first identification information temporarily assigned to a user equipment requesting to camp on the base station is received from the base station through a public network, the server to notify second identification information permanently assigned to the user equipment and associated with the first identification information, and identifies the user equipment by using the second identification information, wherein the server acquires, in response to the request, the second identification information from the core network, and notifies the second identification information to the gateway.

(Supplementary Note 8)

A gateway system comprising:

a plurality of gateways each of which relays traffic between a core network and base stations; and a server that communicates with each of the gateways, wherein each of the gateways waits until a certain time that is shorter than a cycle for a user equipment to transmit a location updating request has elapsed by using as a trigger a connection release between the own gateway and one of the base stations under control of the own gateway, inquires, when the certain time has elapsed, of the server about identification information of a gateway accommodating a base station on which the user equipment camps, and determines, when identification information notified in response to the inquiry does not match identification information assigned to the own gateway, that the user equipment camps on a base station under control of a different gateway, wherein the server manage states in which one or more user equipments camp on the base stations under control of each of the gateways in association with identification information of each of the gateways, and notifies, in response to the inquiry from, each of the gateways of identification information of a gateway corresponding to the user equipment.

(Supplementary Note 9)

A method of controlling a gateway that relays traffic between a core network and a base station incorporated into the core network through a public network, the method comprising:

acquiring, when first identification information temporarily assigned to a user equipment requesting to camp on the base station is received from the base station, second identification information permanently assigned to the user equipment and associated with the first identification information from the core network through a sever capable of communicating with the core network; and identifying the user equipment by using the second identification information.

(Supplementary Note 10)

A method of controlling a gateway that relays traffic between a core network and a base station incorporated into the core network through a public network, the method comprising:

waiting until a certain time that is shorter than a cycle for a user equipment to transmit a location updating request has elapsed, by using as a trigger a connection release between the base station and the gateway;

acquiring, when the certain time has elapsed, identification information of a gateway accommodating a base station on which the user equipment camps, from a server capable of communicating with at least the gateway and a different gateway that relays traffic between the core network and a different base station; and determining, when the acquired identification information does not match identification information assigned to the gateway, that the user equipment camps on the different base station.

(Supplementary Note 11)

A method of controlling a server that communicates with a core network and a gateway relaying traffic between the core network and a base station incorporated into the core network through a public network, the method comprising:

acquiring, when first identification information temporarily assigned to a user equipment requesting to camp on the base station is received from the gateway, second identification information permanently assigned to the user equipment and associated with the first identification information from the core network; and notifying the second identification information to the gateway.

(Supplementary Note 12)

A method of controlling a server that communicates with a core network and a plurality of gateways each of which relays traffic between the core network and a base station incorporated into the core network through a public network, the method comprising:

managing states in which one or more user equipments camp on a base station under control of each of the gateways, in association with identification information of each of the gateways; and notifying, in response to an inquiry from one gateway about a state of one user equipment, the one gateway of identification information of a gateway corresponding to the one user equipment.

REFERENCE SIGNS LIST

10 HNB-GWS
20, 20x CN
30, 30_1 to 30_4, 30x HNB
31, 31_1 to 31_4 FEMTO CELL
40, 40_1, 40_2, 40x UE
110, 110_1, 110_2, 110x HNB-GW
111 HNB I/F
112, 121 BACKBONE IF
113, 123 CONTROL UNIT
114, 124, 124_1, 124_2 MANAGEMENT TABLE
120, 120x AAA SERVER
122 HNB-GW I/F

The invention claimed is:

1. A first gateway that relays traffic between a core network and a base station, the first gateway comprising:
a first communication unit that communicates with the base station through a public network;
a second communication unit that communicates with a server capable of communicating with the core network; and
a control unit that controls the first and second communication units,
wherein the control unit is configured to:
acquire, when first identification information temporarily assigned to one user equipment requesting to camp on the base station is received from the base station, second identification information permanently assigned to the one user equipment and associated with the first identification information from the core network through the server; and
identify the one user equipment by using the second identification information; and
wherein the control unit is further configured to:
transmit to the base station, when a service is provided to the one user equipment and then terminated, a signal for instructing the base station to release a connection between the base station and the first gateway;
wait until a certain time that is shorter than a cycle for the one user equipment to transmit a location updating request has elapsed, by using as a trigger the release of the connection;
acquire, when the certain time has elapsed, from the server, third identification information of a different gateway accommodating a different base station on which the one user equipment camps; and
determine, when the third identification information does not match identification information assigned to the first gateway, that the one user equipment camps on the different base station.

2. A first gateway that relays traffic between a core network and a base station, the first gateway comprising:
a first communication unit that communicates with the base station through a public network;
a second communication unit that communicates with a server capable of communicating with at least the first gateway and a different gateway relaying traffic between the core network and a different base station; and
a control unit that controls the first and second communication units,
wherein the control unit is configured to:
transmit to the base station, when a service is provided to a user equipment and then terminated, a signal for instructing the base station to release a connection between the base station and the first gateway;
wait until a certain time that is shorter than a cycle for the user equipment to transmit a location updating request has elapsed, by using as a trigger the release of the connection;
acquire, when the certain time has elapsed, from the server, identification information of the different gateway accommodating the different base station on which the user equipment camps; and
determine, when the acquired identification information does not match identification information assigned to the first gateway, that the user equipment camps on the different base station.

* * * * *